Figure 1:
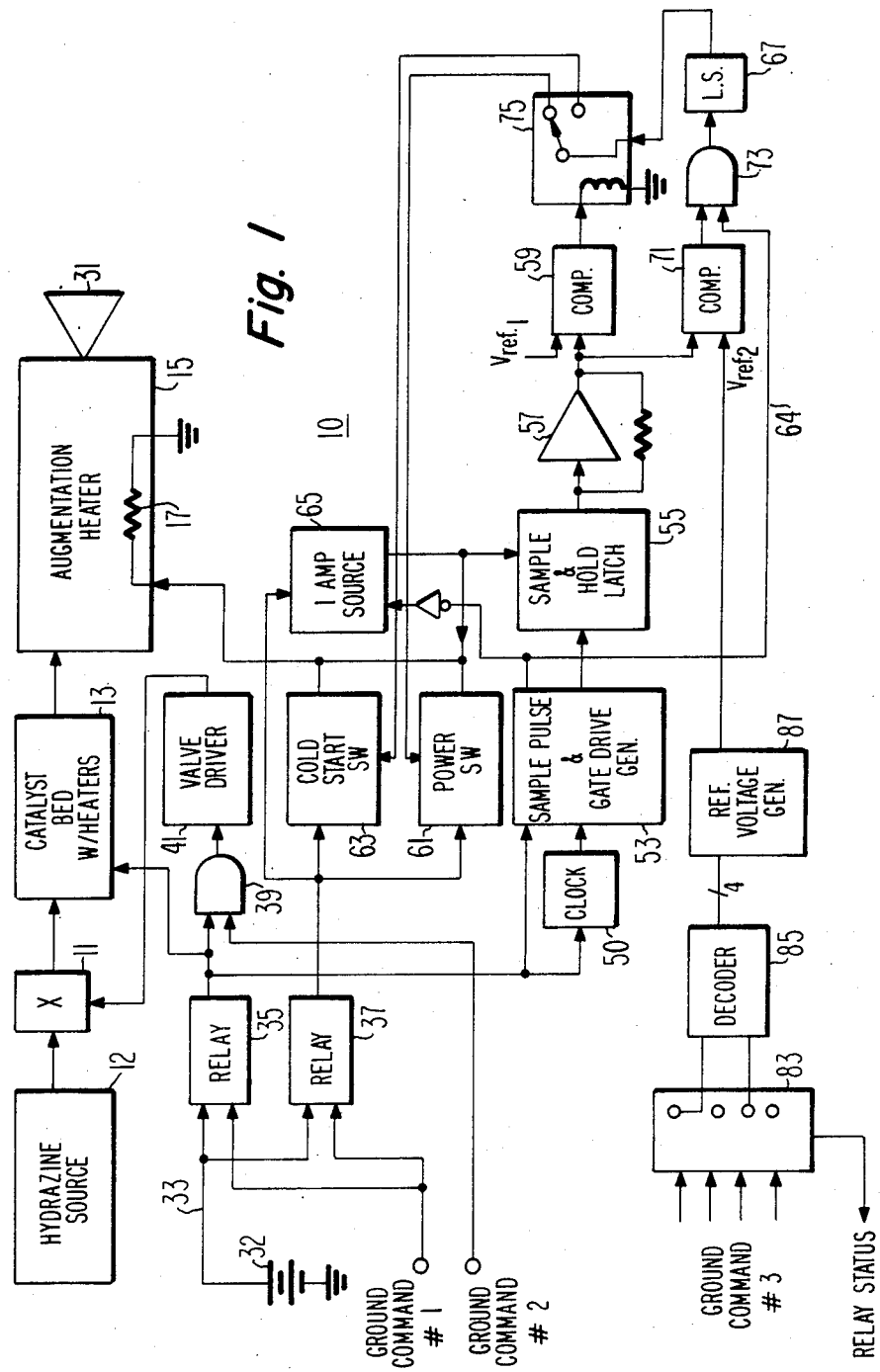

United States Patent [19]

Bingley et al.

[11] Patent Number: 4,656,828
[45] Date of Patent: Apr. 14, 1987

[54] AUGMENTATION HEATER TEMPERATURE CONTROL SYSTEM

[75] Inventors: John D. Bingley, Yardley, Pa.; Dennis F. Longcoy, East Windsor, N.J.

[73] Assignee: RCA Corporation, Princeton, N.J.

[21] Appl. No.: 655,432

[22] Filed: Sep. 28, 1984

[51] Int. Cl.⁴ .............................................. F02K 9/00
[52] U.S. Cl. ................................ 60/203.1; 60/39.462; 219/497
[58] Field of Search ........................... 60/39.462, 203.1; 219/497, 499

[56] References Cited

U.S. PATENT DOCUMENTS

| | | | |
|---|---|---|---|
| 3,700,933 | 10/1972 | Harkenrider et al. | 219/499 |
| 3,745,308 | 7/1973 | Lefferts | 219/499 |
| 3,789,190 | 1/1974 | Orosy et al. | 219/499 |
| 3,959,692 | 5/1976 | Wetzel | 219/499 |
| 4,169,351 | 10/1979 | Barber | 60/203.1 |
| 4,322,946 | 4/1982 | Murch et al. | 60/203.1 |

*Primary Examiner*—Louis J. Casaregola
*Attorney, Agent, or Firm*—Joseph S. Tripoli; Robert L. Troike

[57] ABSTRACT

A control system to maintain a given temperature at a thruster heater resistance element coupled to a battery bus is provided by periodically disconnecting the main power to the resistance element and applying a sampling current to the resistance element to provide a voltage corresponding to the sensed resistance. The voltage representing the sensed resistance value is stored and compared with a reference voltage indicative of a given temperature. Power to the resistance element is disconnected when the sensed voltage exceeds the reference and reconnected when sensed voltage is below the reference.

9 Claims, 2 Drawing Figures

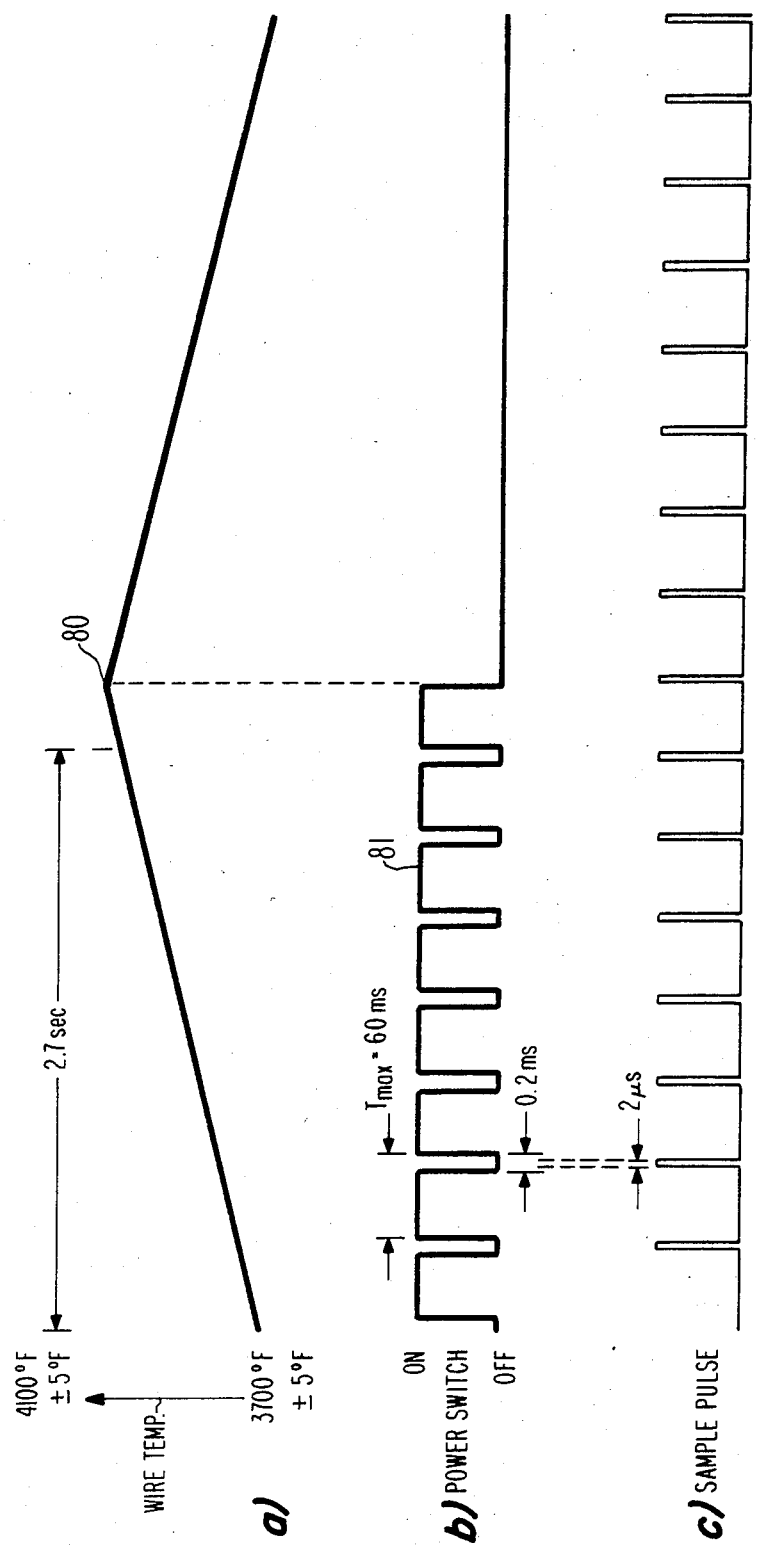

AUGMENTATION HEATER TEMPERATURE CONTROL SYSTEM

This invention relates to a temperature control system for an augmentation heater for a hydrazine thruster.

Geostationary satellites typically use thrusters to perform north-south station-keeping. The north-south station-keeping takes a large portion of the fuel (some 90% of the station-keeping propellant) on the spacecraft in order to keep the satellite in its equatorial orbit. In order to improve the efficiency of these thrusters electrical augmentation heaters are used to increase the temperature of the hydrazine gas. These thrusters with their associated heaters are often referred to as electrothermal hydrazine thrusters (EHT). The augmentation heater includes a resistance element that is powered by a battery such as, for example, a 30 volt battery on the spacecraft. The heater resistance at cold temperature may only be, for example, about 0.2 ohm and when fully heated reaches a resistance of about 1.5 ohms. A copending application Ser. No. 481,384 filed Apr. 1, 1983 describes a cold start-up circuit for this heater. This application is incorporated herein by reference. In order to achieve and maintain constant thrust, the heater wire or element should be maintained at a constant temperature. This is difficult since the battery bus current changes due to the state of charge of the battery and the passage or gas over the heat exchanger which can cool the wire and thereby change its resistance.

In accordance with one embodiment of the present invention the augmentation heater wire element is maintained at the same temperature by a control circuit which connects and disconnects the battery bus to and from the heater wire element in accordance with the resistance sensed across the heater wire element.

In the drawing:

FIG. 1 is a block diagram of the electrothermal hydrazine thruster and the temperature control system according to one preferred embodiment of the present invention; and FIG. 2 is a timing diagram useful in understanding the operation of FIG. 1.

Referring to FIG. 1 an electrothermal hydrazine thruster 10, as disclosed herein, includes a dual series propellant valve system 11 for controlling the input hydrazine from source 12. Two valves are provided for redundancy. These valves are temperature controlled to assure operation. The output from valve system 11 is applied to a catalyst bed 13. The catalyst bed 13 by virtue of a chemical reaction heats up the hydrazine to a temperature of about 1400° F. Catalyst bed 13 includes redundant heaters which are used to preheat the catalyst bed before applying the hydrazine. The heaters prevent damage to the catalyst bed because of the extreme changes in temperature. The hydrazine from the catalyst bed at about 1400° F. is applied to an augmentation heater 15. This augmentation heater raises the hydrazine to a temperature of about 4,000° F. before being expelled from nozzle 31. In FIG. 2 of the previously cited copending application Ser. No. 481,384, assigned to the same assignee, there is illustrated a sketch of the augmentation heater 15.

Referring to FIG. 1, the power to the heaters of the catalyst bed and augmentation heater element 17 is provided, for example, by a battery bus 33 which is connected at one end, for example, to the positive terminal of the battery system represented by battery 32. The opposite terminal end of the battery system is connected to a reference potential such as, for example, ground. The bus 33 is connected to a small current handling relay 35 and a large current handling relay 37. The output of relay 35 is coupled to the heater in catalyst bed 13, to logic gate 39, clock 50 and sample pulse and gate drive generator 53. The output from relay 37 is applied to power switch 61, cold start-up switch 63 and precision current source 65. The power switch 61, cold start-up 63 and precision current source 65 must be enabled to provide current to the heater element 17. Relays 35 and 37 are closed in response to a first command signal from a satellite ground station, for example.

Control of the propellant valve system 11 depends on a second command signal from a ground station, for example. This second command signal is applied to enable AND gate 39 to couple the bus 33 via relay 35 to the valve driver 41. Valve driver 41 supplies sufficient current to operate the propellant valve system 11.

FIG. 1 illustrates the augmentation heater control circuit. This circuit includes clock 50, sample pulse and gate driver generator 53, sample and hold circuit 55, amplifier 57, comparators 59 and 71, logic 73, relay 75, level shift 67, cold start-up switch 63, power switch 61 and precision current source 65. This circuit controls the average wire element temperature to a desired value by measuring the resistance of the heater wire element. The calibration of heater wire element resistance value to wire element temperature is known from previous measurements. The controller alternately connects and disconnects the battery bus 33 to and from the heater wire element 17 by means of the power switch 61 or cold start-up switch 63. The measurement is made when the power switch 61 or cold start-up switch 63 is open and only one ampere is provided from the current source 65 through the resistor heater wire element 17. The voltage developed by this current is exactly equal to the resistance of the wire.

This voltage is sampled periodically using the clocking source 50, which is coupled to sample pulse and gate drive generator 53. The clock 50 and the sample pulse and gate drive generator 53 are energized upon receiving power from the bus 33 through relay 35. The pulses from sample pulse and gate driver generator circuit 53 are illustrated in FIG. 2. Waveform b of FIG. 2 illustrates the gate drive waveform 81 which has a period of 60 milliseconds with an "off" or low level time of 0.2 milliseconds. The sample pulse illustrated by waveform c of FIG. 2 has "on" or high level time period of 2 microseconds and is high when gate drive signal is low. The gate drive generator signal is applied to an AND gate 73 which, when enabled from a high level output from comparator 71, applies a high level signal to level shifter 67. Level shifter 67 increases this high level signal to the appropriate level which enables power switch 61 or cold start-up switch 63. Level shifter 67 includes a generator for raising the voltage at the output thereof to +10 volts above the bus.

When power switch 61 is enabled, the power from the main bus 33 is applied through relay 37 through the power switch 61 to the heater element 17 to energize the augmentation heater 15. The power switch can be constructed of parallel connected power FET switches with the output from level switch 67 selectively applied to bias the gate electrodes via relay 75. When the gate drive signal from gate drive generator 53 is at the low level, AND gate 73 is not enabled removing the gate bias to power switch 61 and the bus 33 supply is removed from heater element 17 and the heater is de-energized.

The sample and hold circuit 55 receives the sample pulse at the output of the sample pulse and gate drive generator 53 and samples the voltage across the resistor element 17 when the power switch 61 is off. When the gate drive signal goes low from generator 53, inverter 77 provides a high enabling signal to the one ampere precision current source 65 which supplies the one ampere sampling current to the augmentation heater element 17. The voltage across the resistance element 17 is then stored in sample and hold latch 55. The stored output from the sample and hold latch 55 is amplified by a noninverting amplifier 57 and compred at comparator 59 to a reference potential $REF_1$. This reference potential at comparator 59 is set at a reference potential which represents the wire resistance at a temperature of approximately 2500° F. When the comparator temperature is below this temperature, the wire is deemed to be in the cold start-up condition and the output of comparator 59 controls relay 75 so that the cold start-up circuit 63 is enabled and the bus supply at relay 37 is applied through the cold start-up 63 to the heater element 17. When the output from the sample and hold latch 55, as amplified at amplifier 57, exceeds the reference voltage $REF_1$ representing 2500° F., the comparator 59 output level places the relay 75 in the second condition or state which allows the drive from the level shifter 67 to bias the power switch 61 to the on or conductive condition in place of the cold start-up switch 63.

The output from the sample and hold latch 55 as amplified by non-inverting amplifier 57 is also compared to a second reference potential, $REF_2$, at comparator 71. This reference potential represents the desired temperature of the heater wire element 17 and controls the duty cycle of the power supplied from the bus 33 to the element 17 to maintain that temperature. The reference voltage can be commanded from, for example, one of four different values and is accomplished by four commands which drive two latching relays 83 providing a coded two-line output. This is decided at decoder 85 and connected to the reference voltage generator 87 which provides one of four stable output voltages to comparator 71.

The output from the comparator 71 is ANDed at gate 73 with the gate drive signal from generator 53. when the amplified (at amplifier 57) output from the sample and hold latch 55 exceeds the reference $REF_2$ voltage level, the output from AND gate 73 goes low providing no biasing level to power switch 61 or cold start-up switch 63. Under these conditions, only the sampling current from source 65 is applied to the heater element 17 when sampling occurs. When the output from the sample and hold latch 55 as amplified by amplifier 57 is below the $REF_2$ level, (representing the condition where the heater element temperature is below the desired temperature) the output from comparator 71 turns on cold start switch 63 or power switch 61 via level shift 67 and relay 75 to provide power from the bus 33 to heater element 17.

In the operation of the system described above, the voltage across resistor element 17 is sampled by the sample and hold latch 55 during the 0.2 millisecond low level from generator 53. During the part of the duty cycle of the controller, when the power switch 61 or the cold start-up is enabled from relay 75, the heater element 17 is increasing the local temperature and the resistance of the wire element is measured periodically (at the sampling rate) by opening the power switch 61 or cold start-up switch 63, enabling the current source 65 and making the voltage measurements. Curve a of FIG. 2 is a plot of temperature versus time. After the voltage measurement is made, the power to the heater element 17 is turned back on by closing the power switch 61 or start-up switch 63. As shown in FIG. 2b, there is a 60 millisecond sampling period and this period is deemed to be required in order to provide the desired accuracy of the temperature measurement. During the period of the "off" time of the power switch 61 or cold start-up switch 63, the heater element is decreasing in temperature and the precision one ampere current source 65 is enabled by the inverted output of the generator 53 and the voltage output is stored in sample and hold latch 55.

The output of the sample and hold latch 55 is amplified by the amplifier 57 and compared at comparators 59 and 71. When the heater element 17 is below the cold start-up reference of 2500° F. the output from comparator 59 puts relay 75 in the state to bias cold start-up switch 63 and power from bus 33 is applied through the cold start-up switches to heater element 17. Cold start-up switch 63 may be like and operate in a manner similar to that discussed in previously submitted application Ser. No. 481,384 assigned to the same assignee. This is used to limit the maximum start-up current at turn-on. Once the heater element 17 exceeds the 2500° F. temperature as sensed across the element during the sampling period the comparator 59 output places the relay 75 in the position to bias power switch 61 closed and power from the bus 33 is applied through switch 61 to element 17. The voltage value at sample and hold latch 55 appropriately amplified is compared at comparator 71 to an established reference. For example, where the selected average temperature of the augmentation heater is to be 4000° F. a voltage value representing that temperature is applied to comparator 71 from commands via relay 83, decoder 85 and generator 87. Under this condition and because of the hysterisis built into comparator 71, as the temperature increases to 4100° F. the augmentation heater remains on except for the sampling periods as illustrated in curve a and waveforms b and c of FIG. 2. Once the temperature is reached at point 80 of curve a, the output from comparator 71 provides a low level that in turn provides a low level from logic 73 which turns off power switch 61 and power is removed as indicated in waveform b of FIG. 2. The temperature of heater element 17 then decreases as indicated by curve a. When the sampled temperature falls below the 4,000° F. level, such as when the element temperature is 3900° F., the output from comparator 71 is again high and this turns on power switch 61 to again provide power from the bus 33 to element 17.

We claim:

1. An improved electrothermal hydrazine thruster comprising:
   a hydrazine source;
   a catalyst bed heater coupled to said hydrazine source for raising the temperature of said hydrazine;
   an output exhaust port;
   an augmentation heater coupled between said catalyst bed and said output exhaust port including a resistance wire heater element for further heating the hydrazine gas to a given temperature before expulsion out of said output exhaust port;
   a battery bus for supplying electrical current to said heater element;

means coupled between said battery bus and said heater element for periodically disconnecting said bus to said heater element and for sensing the resistance across said heater element;

said means for sensing the resistance across said heater element including a constant current source for providing a sampling current and means for periodically applying the sampling current from said source to said heater element when said bus is disconnecting therefrom to obtain a sensed resistance value;

means for comparing the sensed resistance of said heater element to a reference representing a selected maximum heater element temperature; and means coupled to said comparing means for disconnecting said heater element from said bus when said sensed resistance value corresponds to a temperature that exceeds said maximum heater element temperature and for coupling said heater element to said bus when said sensed resistance value represents a temperature below said maximum heating element temperature to substantially maintain a given heater element resistance and hence temperature of the hydrazine at the output exhaust port.

2. The combination of claim 1 wherein said means for sensing includes storage means for storing a signal representing the sampled resistance value.

3. An improved electrothermal hydrazine thruster comprising:

a hydrazine source;

a catalyst bed heater coupled to said hydrazine source for raising the temperature of said hydrazine;

an output exhaust port;

an augmentation heater coupled between said catalyst bed and said output exhaust port including a resistance heater wire element for further heating the hydrazine gas to a given temperature before expulsion out of said output exhaust port;

a battery bus for supplying electrical current to said wire element; and control circuit means coupled between said wire element and said battery bus for connecting and disconnecting said battery bus to and from the heater resistance wire element in accordance with sensed wire element resistance in substantially maintain a given wire resistance and hence temperature of the hydrazine at the output exhaust port;

said control circuit means including means for periodically disconnecting said bus from said heater wire element, a constant current source for providing a constant sampling current and means for applying the constant sampling current from said constant current source to said heater wire element when said bus is disconnected to obtain a sense voltage representing the wire resistance value.

4. The combination of claim 3 wherein said control circuit means includes storage means for storing said sensed voltage representing the resistance value.

5. The combination of claim 4 wherein said control circuit means includes a first comparator for comparing the sensed voltage with a reference potential representing said given temperature of the heater element and means responsive to said sensed voltage exceeding said given temperature for disconnecting said bus from said wire element except for said sampling time periods.

6. The combination of claim 5 wherein said reference potential is electrically commanded to be different values.

7. An improved electrothermal hydrazine thruster comprising:

a hydrazine source;

a catalyst bed heater coupled to said hydrazine source for raising the temperature of said hydrazine;

an output exhaust port;

an augmentation heater coupled between said catalyst bed and said output exhaust port including a resistance wire heater element for further heating the hydrazine gas to a given temperature before expulsion out of said output exhaust port;

a battery bus for supplying electrical current to said heater element;

control circuit means coupled between said heater element and said battery bus for periodically disconnecting said bus from said heater element and for sensing the resistance across said heater element when said bus is disconnected;

first comparing means for comparing said sensed resistance value to a first reference representing a first heater element temperature;

second comparing means for comparing said sensed resistance value to a second reference representing a maximum heater element temperature substantially higher than said first heater element temperature;

means coupled to said first comparing means for coupling a resistance in series with the heater element when said sensed resistance is below said first reference; and means coupled to said second comparing means for disconnecting said heater element from said bus when said sensed resistance value exceeds said second reference and for coupling said heater element to said bus when said sensed resistance represents a temperature below said second reference.

8. The combination of claim 7 wherein said first reference represents a temperature of about 2500° F.

9. The combination of claim 8 wherein said second reference represents a temperature of about 4000° F.

* * * * *